(12) United States Patent
Xue et al.

(10) Patent No.: US 11,076,343 B2
(45) Date of Patent: Jul. 27, 2021

(54) SIGNAL TRANSMISSION METHOD, TERMINAL, AND NETWORK-SIDE DEVICE

(71) Applicant: ZTE CORPORATION, Shenzhen (CN)

(72) Inventors: Yan Xue, Shenzhen (CN); Peng Hao, Shenzhen (CN); Junfeng Zhang, Shenzhen (CN); Zhaohua Lu, Shenzhen (CN); Jian Li, Shenzhen (CN); Xiao Yan, Shenzhen (CN); Haitao Lu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 225 days.

(21) Appl. No.: 16/079,879

(22) PCT Filed: Feb. 22, 2017

(86) PCT No.: PCT/CN2017/074434
§ 371 (c)(1),
(2) Date: Aug. 24, 2018

(87) PCT Pub. No.: WO2017/143989
PCT Pub. Date: Aug. 31, 2017

(65) Prior Publication Data
US 2019/0059043 A1     Feb. 21, 2019

(30) Foreign Application Priority Data

Feb. 26, 2016   (CN) .............................. 201610108125

(51) Int. Cl.
*H04W 48/10*     (2009.01)
*H04W 76/11*     (2018.01)
(Continued)

(52) U.S. Cl.
CPC .......... *H04W 48/10* (2013.01); *H04L 1/0038* (2013.01); *H04W 48/16* (2013.01); *H04W 76/11* (2018.02);
(Continued)

(58) Field of Classification Search
None
See application file for complete search history.

(56) References Cited

U.S. PATENT DOCUMENTS

| 9,538,555 B2 | 1/2017 | Park et al. |
| 2015/0208444 A1 | 7/2015 | Park et al. |

(Continued)

FOREIGN PATENT DOCUMENTS

| CN | 101083609 A | 12/2007 |
| CN | 101252774 A | 8/2008 |

(Continued)

OTHER PUBLICATIONS

International Search Report in international application No. PCT/CN2017/074434, dated May 19, 2017, 2 pgs.

(Continued)

*Primary Examiner* — Kenny S Lin
*Assistant Examiner* — Richard Schnell
(74) *Attorney, Agent, or Firm* — Cantor Colburn LLP

(57) ABSTRACT

A signal transmission method, a terminal and a network-side device. A first network-side device sends access configuration (AC) indication information to a terminal, the AC indication information being used for indicating to the terminal the currently available AC in an access configuration set (ACS). The terminal receives the access configuration set (ACS) and the access configuration (AC) indication information sent by the network-side device, and determines, according to the AC indication information, the currently available AC in the ACS.

15 Claims, 3 Drawing Sheets

(51) Int. Cl.
*H04L 1/00* (2006.01)
*H04W 48/16* (2009.01)
*H04L 5/00* (2006.01)

(52) U.S. Cl.
CPC .......... *H04L 5/0048* (2013.01); *H04L 5/0053* (2013.01); *H04L 5/0098* (2013.01); *Y02D 30/70* (2020.08)

(56) References Cited

U.S. PATENT DOCUMENTS

| | | | | |
|---|---|---|---|---|
| 2016/0087694 | A1* | 3/2016 | Vilaipornsawai ... | H04W 72/121 370/329 |
| 2016/0345311 | A1* | 11/2016 | Chen ................. | H04W 72/0446 |
| 2017/0005764 | A1* | 1/2017 | Park .................... | H04L 5/0051 |
| 2017/0289818 | A1* | 10/2017 | Ng ....................... | H04L 5/0092 |

FOREIGN PATENT DOCUMENTS

| | | |
|---|---|---|
| CN | 103906266 A | 7/2014 |
| WO | 2015109537 A1 | 7/2015 |

OTHER PUBLICATIONS

English Translation of the Written Opinion of the International Search Authority in international application No. PCT/CN2017/074434, dated May 19, 2017, 6 pgs.

\* cited by examiner

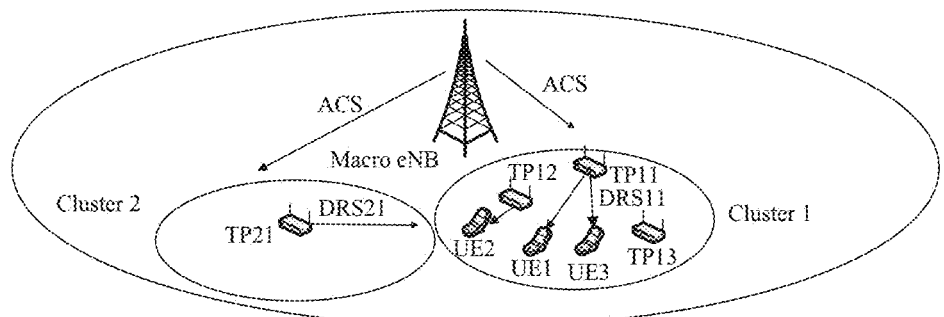
FIG. 1
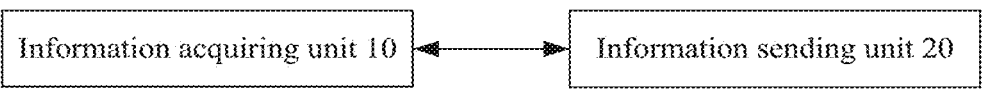
110: A first network-side device sends AC indication information to a terminal, where the AC indication information is used for indicating an AC available in an ACS to the terminal
120: A second network-side device sends one or more ACSs to the terminal
FIG. 2
Information acquiring unit 10 ↔ Information sending unit 20
FIG. 3
ACS sending module 30 ↔ Auxiliary information sending module 40
FIG. 4

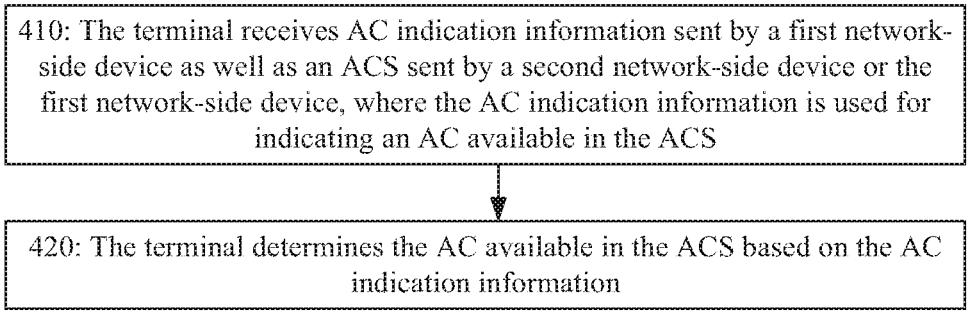
FIG. 9
| ACS Table 1 | |
|---|---|
| DRS ID1 | AC1 |
| DRS ID2 | AC2 |
| DRS ID3 | AC2 |
| DRS ID4 | AC3 |
| ACS Table 2 | |
|---|---|
| DRS ID5 | AC4 |
| DRS ID6 | AC5 |
| DRS ID7 | AC6 |
| DRS ID8 | AC7 |
FIG. 10
| ACS ID1 | |
|---|---|
| DRS ID1 | AC1 |
| DRS ID2 | AC2 |
| DRS ID3 | AC2 |
| DRS ID4 | AC3 |
| ACS ID2 | |
|---|---|
| DRS ID1 | AC4 |
| DRS ID2 | AC5 |
| DRS ID3 | AC6 |
| DRS ID4 | AC7 |
FIG. 11
| ACS ID x | |
|---|---|
| DRS ID1 | ACI1 |
| DRS ID2 | ACI2 |
| DRS ID3 | ACI2 |
| DRS ID4 | ACI3 |
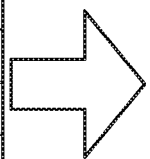
| | |
|---|---|
| ACI1 | AC1 |
| ACI2 | AC2 |
| ACI3 | AC3 |
| ACI4 | AC4 |
FIG. 12

SIGNAL TRANSMISSION METHOD, TERMINAL, AND NETWORK-SIDE DEVICE

TECHNICAL FIELD

The disclosure relates, but is not limited, to communication technology, and in particular to a signal transmission method, a terminal and a network-side device.

BACKGROUND

At present, a primary demand of mobile communication comes from that a surge of data traffic of mobile communication is stimulated by the development of mobile Internet, especially the development of an intelligent terminal. By 2020 and in future, services of the mobile Internet and Internet of things will become a main driving force of the development of the mobile communication. In the 3rd Generation Partnership Project (abbreviated as 3GPP), heterogeneous networks are proposed and a function of a small cell enhancement is introduced in a Long-Term Evolution Advance (abbreviated as LTE-A) system. However, it is generally consumed that there are not greater than four or ten small cells under the same coverage of a macro eNB and this density is far from enough for a capacity requirement in future ten years. In the 5rd Generation (abbreviated as 5G) mobile communication technology, the following demands are proposed: improving a spectral efficiency, improving a network density, increasing a system bandwidth, dispersion of intelligent services, reducing a control overhead of the system broadcasting and the like. An Ultra Dense Network (abbreviated as UDN) is proposed under this background. In the UDN network, transmit points (abbreviated as TPs) has a very large density (dozens to hundreds of TPs are included in one macro eNB). The coverage range of the TPs is further narrowed (dozens or even tens of meters). Each TP may only serve one or more user. TP not serving a user enters a dormant state or an off state. The TP may be a low-power eNB (also referred to a small station), a relay station or the like. Hence, it needs to consider an access mode with the user as a center in the 5G system. When the user has a demand, a response is made to achieve the purposes of saving the energy of an eNB and reducing the inter-cell interference.

For a conventional Long-Term Evolution (LTE) network, mechanisms of a cell discovery and user access are as follows. Each cell needs to transmit a Primary Synchronization Signal (abbreviated as PSS) and a Secondary Synchronization Signal (abbreviated as SSS) at a period of 5 ms. A User Equipment (abbreviated as UE) detects a synchronization channel to achieve synchronization and obtain a cell identity. Each cell transmits a Cell-specific Reference Signal (abbreviated as CRS, also referred to a public reference signal) on multiple symbols of each 1 ms sub-frame. A user measures the CRS to obtain a Reference Signal Received Power (abbreviated as RSRP) and selects a serving cell. Each cell broadcasts a Master Information Block (abbreviated as MIB) to all UEs in the cell at a 10 ms period via a Physical Broadcast Channel (PBCH), and transmits a Physical Downlink Shared Channel (abbreviated as PDSCH) with a System Information Block (SIB) at a high frequency. After successfully detecting the system information from these channels, the UE obtains an uplink Access Configuration (abbreviated as AC) and then performs an uplink access.

In a 3gpp Release12 small cell, Discovery Reference Signal (DRS) of a cell and on/off mechanism of a small cell (also used to indicate a corresponding small eNB) are introduced to reduce a power overhead and the inter-cell interference. If there is no service demand, the small cell transmits a DRS signal at a period of 40 ms or more, transmits the system information at a high frequency and turns off the transmission of other signals. After a terminal detects the DRS, the small cell turns on normal signal transmission and performs service transmission. Under such a mechanism, both the resource overhead and the interference of a neighboring cell are relatively large. In addition, after the terminal detects the DRS, the terminal needs to notify a macro eNB and the macro eNB awakens the small cell. For the 5G system, the system may network independently and cannot depend on a previous network, hence, such a wakening mechanism is unavailable.

SUMMARY

The following is an overview of a subject matter described in detail here, which is not intended to limit the scope of protection of claims.

In view of this, the following solutions are provided by the embodiments of the disclosure.

A signal transmission method includes the following operations.

A first network-side device sends AC indication information to a terminal, where the AC indication information is used for indicating an AC available in an Access Configuration Set (ACS) to the terminal.

A signal transmission method includes the following operations.

A terminal receives an ACS and AC indication information sent by a network-side device, where the AC indication information is used for indicating an AC available in the ACS; and the terminal determines the AC available in the ACS based on the AC indication information.

A first network-side device includes an AC indication module, and the AC indication module includes an information acquiring unit and an information sending unit.

The information acquiring unit is configured to acquire AC indication information, where the AC indication information is used for indicating an AC available in an ACS to a terminal.

The information sending unit is configured to send the AC indication information to the terminal.

A second network-side device includes at least one module of an ACS sending module or an auxiliary information sending module.

The ACS sending module includes an ACS acquiring unit and an ACS sending unit.

The ACS acquiring unit is configured to acquire one or more ACSs to be sent to a terminal.

The ACS sending unit is configured to send the obtained ACS to the terminal.

The auxiliary information sending module includes an information acquiring unit and an information sending unit.

The information acquiring unit is configured to acquire auxiliary information, where the auxiliary information is used for assisting the terminal to receive one or more of a DRS, an AC and the ACS.

The information sending unit is configured to send the obtained auxiliary information to the terminal.

A terminal includes an AC processing module, and the AC processing module includes an information receiving unit and an information determination unit.

The information receiving unit is configured to receive an ACS and AC indication information sent by a network-side device, where the AC indication information is used for indicating an AC available in the ACS.

The information determination unit is configured to determine the AC available in the ACS based on the AC indication information.

A computer readable storage medium stores a computer executable instruction, and the computer executable instruction implements the above-described signal transmission method when being executed by a processor.

With the above-described signal transmission method, the terminal and the network-side device, the transmission and the indication of the AC may be implemented, the overhead is small, the interference is small, and the requirements of a novel radio access system such as a radio access system in a 5G may be met. Further, a wake-up mechanism may be supported when TPs are networked independently.

After reading and understanding accompanying drawings and detailed description, other aspects will become apparent.

BRIEF DESCRIPTION OF DRAWINGS

FIG. 1 is an exemplary schematic diagram of networking of a UDN network.

FIG. 2 is a flowchart of a signal transmission method of a network-side device according to a first embodiment of the disclosure.

FIG. 3 is a module diagram of a first network-side device according to a first embodiment of the disclosure.

FIG. 4 is a module diagram of a second network-side device according to a first embodiment of the disclosure.

FIG. 9 is a flowchart of a signal transmission method of a terminal according to a fourth embodiment of the disclosure.

FIG. 10 is a schematic diagram of a first exemplary manner for finding an ACS in the disclosure.

FIG. 11 is a schematic diagram of a second exemplary manner for finding an ACS in the disclosure.

FIG. 12 is a schematic diagram of a third exemplary manner for finding an ACS in the disclosure.

DETAILED DESCRIPTION

Figure 5:
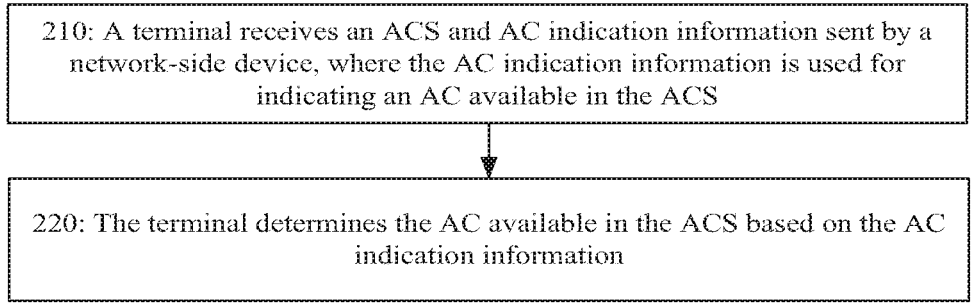
FIG. 5 is a flowchart of a signal transmission method of a terminal according to a second embodiment of the disclosure.

The embodiments of the disclosure will be described in detail below with reference to the accompanying drawings. It is to be noted that, the embodiments of the present disclosure and the features of the embodiments may be combined with each other without conflict.

First Embodiment

In a networking environment according to this embodiment, a conventional Radio Access Technology (RAT) system and a new RAT system may coexist, or there all are the new RAT systems. The conventional RAT system herein may be, for example, a Code Division Multiple Access (CDMA) system, an LTE system (including an LTE-A), a Universal Mobile Telecommunications System (UMTS) system, a 802.11 system and a Global System for Mobile Communication (GSM) system. The new RAT system may be, for example, an RAT system in a 5G, where one or more TPs in the new RAT system form a TP cluster. In addition, the networking environment in this embodiment includes one or more macro eNBs. There are multiple TP clusters in a service area of the macro eNB, and each TP cluster includes one or more TPs. FIG. 1 is an example of the networking and illustrates a macro eNB. There are two TP clusters in a service area of the macro eNB. A first cluster includes three TPs, and a second cluster includes one TP.

In this embodiment, one or more ACSs are configured for a terminal access. Each ACS includes one or more ACs. One TP cluster may be configured with one or more ACs provided for use when a terminal under the TP cluster is accessed to a TP in the cluster. The ACS and the AC may be configured according to an agreement in a protocol or a corresponding configuration strategy. Other embodiments are the same herewith. Under such a configuration, this embodiment of the disclosure may provide solutions to send the ACS and necessary indication information reasonably by a network-side device.

The AC includes access parameters configured for the terminal access. In this embodiment, the AC includes at least one of resource information of a first resource or resource information of a second resource. The first resource is resource used for a terminal to send an access request message. The second resource is resource used for a first network-side device to send a response message in response to the access request message of the terminal. The resource information may indicate an actual use resource of a message or indicate a resource range of the actual use resource of a message. The resources include at least one of a time domain resource, a frequency domain resource, a space domain resource or a code domain resource. For example, when the system is a time-frequency domain communication system similar to LTE or Orthogonal Frequency Division Multiple Access (OFDMA), the resources include a position, a size and the like of a time-frequency domain. When a request signal similar to a random access preamble and the like is adopted, the resources further include a preamble code resource. When a resource range is adopted for representation, the terminal needs to randomly select an available resource in a resource indication range by itself and sends an access request on the resource.

Particularly, in an example, the resource information of the second resource is implicitly indicated by the resource information of the first resource and an agreed positional relationship between the second resource and the first resource, such as a positional relationship on a time domain.

In this embodiment, the DRS is a DRS in a new RAT system such as the 5G, and is used in one or more of AC information indication, cell discovery, channel estimation, channel measurement and coarse synchronization. The DRS is different from that defined by the LTE-A system, for example, one or more of signals such as a broadband CRS, a Channel State Information Reference Signal (CSI-RS), a PSS and an SSS are excluded. Other embodiments are the same herewith. The coarse synchronization includes coarse synchronization of a time, a frequency and a phase, in which an uplink sending time is adjusted according to a measurement result of the DRS and Automatic Frequency Control (AFC) is performed so as to meet a precondition for further performing accurate synchronization. In other embodiments, the ACS and the DRS may be the same as that of this embodiment.

In the signal transmission method of this embodiment, the first network-side device sends the AC indication information but does not send the ACS, and a second network-side device sends the ACS. In the disclosure, the first network-side device and the second network-side device are different devices.

As shown in FIG. 2, the method includes the following acts.

At block 110, a first network-side device sends AC indication information to a terminal, where the AC indication information is used for indicating an AC available in an ACS to the terminal.

In this embodiment, the above-described first network-side device is a TP. However, the disclosure is not limited to this. The AC indication information includes one or more of ACS identification information and AC identification information. For example, when a second network-side device sends multiple ACSs and each ACS has an own ACS ID (namely, the ACS identification information), the AC indication information sent by a first network-side device in a service area of the second network-side device may include an ACS ID of an available ACS, and the terminal determines the available ACS from multiple received ACSs based on the received ACS ID. However, when the ACS ID is sent by the second network-side device and the ACs in different ACSs have different AC identification information, the AC indication information may not include the ACS identification information. The AC identification information may include an AC index and one AC index corresponds to a unique AC. However, the AC identification information also may use a DRS identity. The AC may be directly identified by the DRS identity, or the AC is indirectly identified using a one-to-one or many-to-one mapping relationship between the DRS identity and the AC index. Upon reception of a DRS sequence, the terminal may identify a DRS identity corresponding to the DRS sequence, and thus the DRS sequence may also be used for identifying the AC.

In this act, the first network-side device carries or indicates the AC indication information by a DRS, and the following manners may be adopted.

The first network-side device sends a DRS and uses the DRS as the AC indication information; or the first network-side device sends a DRS including a sequence portion and a load portion, where the AC indication information is carried in the load portion of the DRS; or the first network-side device sends a DRS and the AC indication information on different resources, where the DRS carries or does not carry information on resource used by the AC indication information.

In this embodiment, the DRS is a DRS in the new RAT system, and is used in one or more of AC information indication, cell discovery, channel estimation, channel measurement and coarse synchronization. It is to be noted that, the DRS in the disclosure may be the same as or different from that in the LTE system. For example, the DRS in this embodiment does not the PSS and the SSS, but can be used for implementing the coarse synchronization.

In this embodiment, when a TP cluster includes multiple TPs, only one TP or a part of TPs in the cluster transmits a DRS signal, and the other dormant TPs without a service demand do not send the DRS signal. The dormant TP is awakened upon detection of an access request message from the terminal on resource specified by the AC. Or, it also may be appropriate that only one TP or a part of TPs in the cluster transmits the DRS signal and system information, and other dormant TPs without a service demand do not send the system information. The dormant TP is awakened upon detection of the access request message from the terminal on the resource specified of the AC. In this way, the TP in a dormant state has a smaller overhead and saves more power. The dormant TP is awakened in response to the terminal access and do not need to be notified by the macro eNB, hence, the TP still may be awakened even in a scene in which no macro eNB is provided or the TP is disconnected with the macro eNB.

At block 120, a second network-side device sends one or more ACSs to the terminal.

At blocks 110 and 120, transmissions of the first network-side device and the second network-side device may be performed respectively and there is no order.

In this embodiment, the second network-side device may send the ACS to the terminal as system information, for example, the ACS is sent on a broadcast channel, a PDSCH or other channels.

In this embodiment, the second network-side device is a macro eNB of which a service area covers one or more TP clusters, and the macro eNB is a macro eNB in the conventional RAT system or the new RAT system. The ACS sent by the second network-side device to the terminal may include all ACs used in a network, or may also only include all ACs used in a setting area. The setting area includes service areas of the one or more second network-side devices.

In this embodiment, the second network-side device further sends first auxiliary information for receiving the DRS to the terminal. The first auxiliary information includes one or more of the following: information on resource used by the DRS, a transmission period of the DRS and identification information of a DRS to be received.

In this embodiment, the AC identification information is only sent in the cluster, and the frequency of sending the AC identification information may be far lower than the frequency at which the macro eNB sends the ACS. It is beneficial to respectively control a frequency of sending the message on different planes by sending the ACS and the AC indication information at separate frequencies, and thus it is beneficial to shorten the start time of the TP is and perform environment-friendly and energy-saving management more effectively. In this embodiment, the ACS and AC identification information may be a physical layer signaling and may also be a higher layer signaling. Resources for sending the ACS and the AC indication information may be fixed resources or may be adjusted semi-statically.

This embodiment further provides a first network-side device, which includes an AC indication module. As shown in FIG. 3, the AC indication module includes an information acquiring unit 10 and an information sending unit 20.

The information acquiring unit 10 is configured to acquire AC indication information, where the AC indication information is used for indicating an AC available in an ACS to a terminal.

The information sending unit 20 is configured to send the AC indication information to the terminal.

In an embodiment, the information sending unit sends the AC indication information to the terminal, which includes the following operations.

The information sending unit sends a DRS as the AC indication information.

Or, the information sending unit sends a DRS, where the AC indication information is carried in a load portion of the DRS.

Or, the information sending unit sends a DRS and the AC indication information on different resources, where information on resource used by the AC indication information is carried in the DRS or not.

In an embodiment, the AC indication information includes one or more of ACS identification information and AC identification information.

The AC identification information includes an AC index; or the AC identification information includes a DRS identity or a DRS sequence, and there is a one-to-one or many-to-one mapping relationship between the DRS identity or the DRS sequence and the AC or the AC index.

In an embodiment, the first network-side device is a TP of the new RAT system, where one or more TPs form a TP cluster and one TP cluster uses one or more ACs.

The AC indication information obtained by the information acquiring unit is used for indicating an AC available in the ACS to a terminal under a TP cluster in which the TP is located.

In an actual application, the information acquiring unit may be implemented as a baseband processing unit in the TP, and the information sending unit may be implemented as a radio-frequency processing unit in the TP.

The embodiment further provides a second network-side device. As shown in FIG. 4, the second network-side device includes an ACS sending module 30 and an auxiliary information sending module 40.

The ACS sending module 30 includes an ACS acquiring unit and an ACS sending unit.

The ACS acquiring unit is configured to acquire one or more ACSs to be sent to a terminal.

The ACS sending unit is configured to send the obtained ACS to the terminal, for example, the obtained ACS is sent to the terminal as system information.

The auxiliary information sending module 40 includes an information acquiring unit and an information sending unit.

The information acquiring unit is configured to acquire auxiliary information, where the auxiliary information is used for assisting the terminal to receive a DRS, for example, it includes one or more of information on resource used by the DRS, a transmission period of the DRS and identification information of a DRS to be received.

The information sending unit is configured to send the obtained auxiliary information to the terminal.

In an embodiment, the ACS obtained by the ACS acquiring unit includes all ACs used in a network, or includes all ACs used in a setting area. The setting area includes service areas of one or more second network-side devices.

In an embodiment, the second network-side device is a macro eNB of which a service area covers one or more TP clusters, and the macro eNB is a macro eNB in the conventional RAT system or the new RAT system.

In an actual application, the ACS acquiring unit may be implemented as a baseband processing unit in the macro eNB, and the ACS sending unit may be implemented as a radio-frequency processing unit in the macro eNB. The information acquiring unit may be implemented as the baseband processing unit in the macro eNB, and the information sending unit may be implemented as the radio-frequency processing unit in the macro eNB. In the above-described embodiment, the DRS is used to carry or indicate the AC indication information. The difference of another embodiment from the above-described embodiment lies in: the AC indication information sent as an independent information element to be sent and its resource position is not indicated in the DRS, and the terminal may blindly detect the AC indication information. Or the second network-side device sends second auxiliary information (such as information on resource used by the AC, a transmission period of the AC and the like) for receiving the AC indication information. The second auxiliary information may be sent as the system information, and the terminal receives the AC indication information sent by the first network-side device based on the second auxiliary information. Correspondingly, in another embodiment, the information acquiring unit in an auxiliary information sending module of the second network-side device is further configured to acquire the second auxiliary information for receiving the AC indication information, and the information sending unit is further configured to send the second auxiliary information.

Second Embodiment

In the first embodiment, the transmissions of the ACS and the AC indication information are described in terms of a network-side device. However, in this embodiment, the signal transmission is described in terms of a terminal side, and a network-side device and a method for sending an ACS and an AC are referred to the description in the first embodiment and will not be described here.

As shown in FIG. 5, a signal transmission method in this embodiment includes the following acts.

At block 210, a terminal receives an ACS and AC indication information sent by a network-side device, where the AC indication information is used for indicating an AC available in the ACS.

In this embodiment, the terminal receives the AC indication information sent by a first network-side device, and the AC indication information is carried or indicated by a DRS. The terminal receives a DRS sent by the first network-side device and uses the DRS as the AC indication information; or the terminal receives a DRS sent by the first network-side device and acquires the AC indication information from a load portion of the DRS; or the terminal receives a DRS sent by the first network-side device, and receives the AC indication information based on information on resource used by the AC indication information carried in the DRS. In other embodiments, the terminal may also blindly detect the AC indication information; or the terminal receives the AC indication information based on second auxiliary information sent by a second network-side device for receiving the AC indication information, where the second auxiliary information includes at least one of information on resource used by the AC or a transmission period of the AC.

In this embodiment, when the terminal receives the DRS, the terminal receives first auxiliary information sent by the second network-side device for receiving the DRS first and receives the DRS based on the first auxiliary information. The first auxiliary information may include one or more of the following: information on resource used by the DRS, a transmission period of the DRS and identification information of a DRS to be received. The terminal may also receive the DRS by blind detection.

In this embodiment, a content of the AC indication information may be the same as that of the first embodiment and includes one or more of the ACS identification information and the AC identification information. The AC identification information includes an AC index; or the AC identification information includes a DRS identity or a DRS sequence, there is a one-to-one or many-to-one mapping relationship between the DRS identity or the DRS sequence and the AC or the AC index. Correspondingly, when the terminal determines the AC available in the ACS based on the AC indication information, the available AC may be selected from the received ACS directly based on the AC identification information; or the terminal determines an ACS available in the received ACS based on the ACS identification information, and then selects the available AC from the available ACS based on the AC identification information.

At block 220, the terminal determines the AC available in the ACS based on the AC indication information.

In this embodiment, the terminal receives system information sent by the second network-side device and acquires an ACS sent by the second network-side device therefrom.

After the terminal receives the ACS sent by the second network-side device, the terminal may store the received ACS or update the original stored ACS with the received ACS. After the terminal receives new AC indication information from the network-side device, the stored ACS is searched for the AC corresponding to the new AC indication information based on the new AC indication information first. When the corresponding AC cannot be founded, then an ACS sent by the network-side device is received and an AC corresponding to the new AC indication information is determined.

In a scene in which a moving range of the terminal is limited, the terminal can be accessed to without changing the AC. At this moment, after the terminal determines the AC available in the ACS based on the AC indication information, the available AC may be stored and is used in a next access.

In this embodiment, the above-described first network-side device is a TP in the new RAT system. One or more TPs form a TP cluster, and one TP cluster uses one or more ACs. The AC indication information is used for indicating an AC available in the ACS to a terminal under a TP cluster in which the TP is located. The second network-side device is a macro eNB of which a service area covers one or more TP clusters, and the macro eNB may belong to the conventional RAT system or the new RAT system.

Figure 6:
FIG. 6 is a module diagram of a terminal according to a second embodiment of the disclosure.

The embodiment further provides a terminal, which includes an AC processing module. As shown in FIG. 6, the AC processing module includes an information receiving unit 50 and an information determination unit 60.

The information receiving unit 50 is configured to receive an ACS and AC indication information sent by a network-side device, where the AC indication information is used for indicating an AC available in the ACS.

The information determination unit 60 is configured to determine the AC available in the ACS based on the AC indication information.

In an embodiment, the information receiving unit receives the AC indication information sent by the network-side device, which includes: the terminal receives AC indication information sent by a first network-side device using one of the following manners.

The information receiving unit blindly detects the AC indication information. Or, the information receiving unit receives a DRS sent by the first network-side device and uses the DRS as the AC indication information.

Or, the information receiving unit receives a DRS sent by the first network-side device and acquires the AC indication information from a load portion of the DRS.

Or, the information receiving unit receives a DRS sent by the first network-side device, and receives the AC indication information based on information on resource used by the AC indication information carried in the DRS.

Or, the information receiving unit receives the AC indication information based on second auxiliary information sent by a second network-side device for receiving the AC indication information, where the second auxiliary information includes at least one of information on resource used by the AC or a transmission period of the AC.

In an embodiment, the AC indication information received by the information receiving unit includes one or more of ACS identification information and AC identification information.

The information determination unit determines the AC available in the ACS based on the AC indication information, which includes the following operations. The available AC is selected from the received ACS directly based on the AC identification information. Or, an available ACS in the received ACS is determined based on the ACS identification information, and then the available AC is selected from the available ACS based on the AC identification information. The AC identification information includes an AC index; or the AC identification information includes a DRS identity or a DRS sequence. There is a one-to-one or many-to-one mapping relationship between the DRS identity or the DRS sequence and the AC or the AC index.

In an embodiment, the information receiving unit receives the DRS sent by the first network-side device, which includes the following operations. The information receiving unit first receives first auxiliary information sent by the second network-side device for receiving the DRS, and receives the DRS based on the first auxiliary information. The first auxiliary information includes one or more of the following: information on resource used by the DRS, a transmission period of the DRS and identification information of a DRS to be received.

In an embodiment, the information receiving unit receives the ACS sent by the network-side device, which includes the following operations. The terminal receives system information sent by the second network-side device and acquires an ACS sent by the second network-side device therefrom.

In an embodiment, the information receiving unit is further configured to store the determined available AC.

The terminal further includes: an uplink access module, configured to perform an uplink access using the AC stored by the information receiving unit.

In an embodiment, the AC processing module further includes an AC searching unit.

The information receiving unit is further configured to store the received ACS or update an original stored ACS with the received ACS, and first notify the AC searching unit to search for an AC upon reception of new AC indication information.

The AC searching unit is configured to search the stored ACS for an AC corresponding to the new AC indication information based on the new AC indication information upon reception of a notification that the information receiving unit searches for the AC. The information receiving unit is notified when the corresponding AC cannot be found.

The information receiving unit is further configured to receive an ACS sent by the network-side device upon reception of a notification that the AC searching unit cannot find the AC, and notify the information determination unit to determine an AC corresponding to the new AC indication information.

In an embodiment, the first network-side device is a TP in the new RAT system. One or more TPs form a TP cluster and one TP cluster uses one or more ACs. The AC indication information is used for indicating an AC available in the ACS to a terminal under a cluster in which the TP is located.

The second network-side device is a macro eNB of which a service area covers one or more TP clusters in the conventional RAT system or the new RAT system.

The first network-side device is a TP of the new RAT system. One or more TPs form a TP cluster and one TP cluster uses one or more ACs.

The second network-side device is a macro eNB of which a service area covers one or more TP clusters, and the macro eNB is a macro eNB in the conventional RAT system or the new RAT system.

In an actual application, the information receiving unit and the uplink access module may be implemented as a wireless communication unit in the terminal, and the information determination unit and the AC searching unit may be implemented as a controller in the terminal.

Third Embodiment

The networking in this embodiment is the same as that of the first embodiment and also includes a macro eNB and a TP cluster in a service area of the macro eNB, which may be referred to FIG. 1. In a signal transmission method according to this embodiment, a first network-side device such as a TP is also configured to send AC indication information, and a second network-side device such as a macro eNB is also configured to send an ACS. The transmission mode may also be the same as that of the first embodiment. The difference from the first embodiment lies in: considering a condition in which a terminal cannot be connected to the second network-side device, for example, the terminal does not support an access to the second network-side device or a connection with the second network-side device fails, the first network-side device in this embodiment also sends the ACS.

Figure 7:
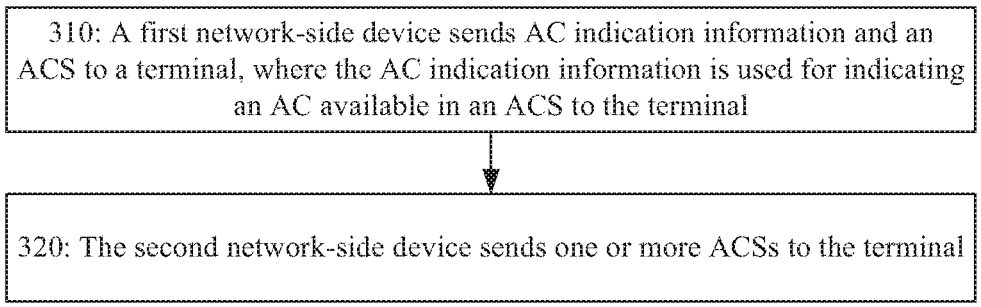
FIG. 7 is a flowchart of a signal transmission method of a network-side device according to a third embodiment of the disclosure.

As shown in FIG. 7, a signal transmission method of a network-side device in this embodiment includes the following acts.

At block 310, a first network-side device sends AC indication information and an ACS to a terminal, where the AC indication information is used for indicating an AC available in an ACS to the terminal.

A method for sending the AC indication information by the first network-side device is the same as that of the first embodiment and will not be described.

In this embodiment, the first network-side device sends one or more ACSs to the terminal. The first network-side device sends a DRS and a load portion of the DRS carries the ACS; or the first network-side device sends a DRS and the ACS on different resources, and the DRS may carry or not carry information on resource used by the ACS.

At block 320, the second network-side device sends one or more ACSs to the terminal.

In this embodiment, the second network-side device sends the ACS to the terminal as system information. Meanwhile, the second network-side device may send at least one of first auxiliary information for receiving the DRS or second auxiliary information for receiving the AC indication information to the terminal. The first auxiliary information and the second auxiliary information may be the same as that in the first embodiment. In this embodiment, when the DRS signal and the ACS are sent on different resources, the second network-side device further sends third auxiliary information for receiving the ACS sent by the first network-side device to the terminal, and the third auxiliary information includes one or more of the following: information on resource used by the ACS, a transmission period of the ACS and identification information of an ACS to be received.

Figure 8:
FIG. 8 is a module diagram of a first network-side device according to a third embodiment of the disclosure.

The embodiment further provides a first network-side device. As shown in FIG. 8, the first network-side device includes an AC indication module 70 and an ACS sending module 80. The AC indication module 70 is the same as that in the first embodiment and will not be described. The ACS sending module 80 includes an ACS acquiring unit and an ACS sending unit.

The ACS acquiring unit is configured to acquire one or more ACSs to be sent to a terminal.

The ACS sending unit is configured to send the obtained ACS to the terminal.

In an embodiment, the ACS sending unit sends the ACS to the terminal, which includes the following operations. The ACS sending unit sends a DRS, and a load portion of the DRS carries the ACS. Or, the ACS sending unit sends a DRS and the ACS on different resources, and the DRS carries or does not carry information on resource used by the ACS.

In an actual application, the ACS acquiring unit may be implemented as a baseband processing unit in the TP, and the ACS sending unit may be implemented as a radio-frequency processing unit in the TP.

The embodiment further provides a second network-side device, which includes an ACS sending module and may further include an auxiliary information sending module. The two modules may be the same as corresponding modules in the first embodiment. Particularly, in this embodiment, an information acquiring unit in the auxiliary information sending module may further acquire third auxiliary information for receiving an ACS sent by a first network-side device, and an information sending unit in the auxiliary information sending module may further send the third auxiliary information to a terminal.

Other embodiments may further be provided by the disclosure. For example, under a networking environment without the second network-side device such as a macro eNB, the ACS and the auxiliary information cannot be sent by the second network-side device. In this case, the ACS and the AC indication information may be sent by the first network-side device, and the first network-side device sends the ACS and AC indication information in the same way as that in this embodiment.

Fourth Embodiment

In the third embodiment, the transmission of the ACS and the AC indication information is described in terms of a network-side device. However, in this embodiment, the transmission of these signals is described in terms of a terminal side, and a network-side device and a manner for sending an ACS and an AC are referred to the description in the third embodiment and will not be described here.

As shown in FIG. 9, a signal transmission method of the terminal in this embodiment includes the following acts.

At block 410, the terminal receives AC indication information sent by a first network-side device as well as an ACS sent by a second network-side device or the first network-side device, where the AC indication information is used for indicating an AC available in the ACS.

In this embodiment, the terminal may receive the AC indication information in the same way as that in the second embodiment. To receive the ACS, the terminal preferentially establishes a connection with the second network-side device, receives system information sent by the second network-side device, and obtains the ACS therefrom. The terminal receives an ACS sent by the first network-side device when the connection cannot be established or the ACS cannot be obtained.

The terminal may receive the ACS sent by the first network-side device in one of the following manners.

The ACS sent by the first network-side device is received by blind detection.

A DRS sent by the first network-side device is received and the ACS is obtained from a load portion of the DRS.

A DRS sent by the first network-side device is received, and the ACS is received based on information on resource used by the ACS carried in the DRS.

Third auxiliary information sent by the second network-side device for receiving the ACS sent by the first network-side device is received, and the ACS is received based on the third auxiliary information. The third auxiliary information includes one or more of the following: information on resource used by the ACS, a transmission period of the ACS and identification information of an ACS to be received.

The DRS may be received in the same manner as that in the second embodiment.

At block 420, the terminal determines the AC available in the ACS based on the AC indication information.

This block and subsequent processing thereof may be the same as 220 in the second embodiment.

The embodiment further provides a terminal, which includes an AC processing module. The AC processing module includes an information receiving unit and an information determination unit. The difference in functions of the two units from that in the second embodiment lies in: to receive an ACS sent by a network-side device, the information receiving unit preferentially establishes a connection with the second network-side device, receives system information sent by the second network-side device and obtain the ACS therefrom. The information receiving unit receives an ACS sent by the first network-side device when the connection cannot be established or the ACS cannot be obtained.

The information receiving unit may receive the ACS sent by the first network-side device in one of the following manners.

The ACS sent by the first network-side device is received by blind detection.

A DRS sent by the first network-side device is received and the ACS is obtained from a load portion of the DRS.

A DRS sent by the first network-side device is received, and the ACS is received based on information on resource used by the ACS carried by the DRS.

Third auxiliary information sent by the second network-side device for receiving the ACS sent by the first network-side device is received, and the ACS is received based on the third auxiliary information. The third auxiliary information includes one or more of the following: information on resource used by the ACS, a transmission period of the ACS and identification information of an ACS to be received.

In another embodiment under a networking environment without a second network-side device such as a macro eNB, the ACS and the auxiliary information cannot be sent by the second network-side device, and the terminal also cannot receive the ACS and the auxiliary information sent by the second network-side device. In this case, the terminal side may receive the ACS and the AC sent by the first network-side device such as the TP. Except that a receiving manner based on the auxiliary information sent by the second network-side device, the terminal may receive the ACS and the AC sent by the first network-side device by the blind detection or a manner based on the DRS and the like in this embodiment.

In an actual application, the information receiving unit may be implemented as a wireless communication unit in the terminal, and the information determination unit may be implemented as a controller in the terminal.

Illustrations will be given below by examples in the application.

First Example

This example illustrates signal transmission of an AC and an ACS. In this example, in a specific area of a system and in a service area of a macro eNB, multiple TP clusters are present. Each TP cluster includes one or more TPs. When the TP cluster includes multiple TPs, only one TP or a part of TPs (one or more TPs but not including all TPs) in the cluster may transmit a DRS signal, and other TPs without a service demand are in dormancy. The dormant TP detects an access request message (also referred to as MSG1) of a terminal on a specified resource and does not transmit signals. In another example, it may also be appropriate that the TP not in dormancy sends a DRS and system information, and the dormant TP does not send the system information and may send or not send the DRS, thereby implementing the energy saving in a power and reducing the interference. By detecting a DRS signal, the terminal triggers an uplink access process and an appropriate TP is awakened to provide service transmission for the terminal. The TP transmits the service only when a user has a service. After the service is transmitted completely, the TP continues to be in dormancy. Therefore, the TP transmits only when the user has a demand, and is in dormancy when the user does not have the demand.

As shown in FIG. 1, in the exemplary networking of the UDN, two TP clusters are provided in an area of a macro eNB. There are three TPs in a first cluster. The TP 11 transmits the DRS signal and provides service transmission for a UE 1 and a UE 3, and the TP 12 makes a response to an access request from the UE 2 and provides the service transmission for the UE 2. The TP 13 is in dormancy and does not transmit any signal. One TP in a second cluster transmits the DRS and provides the service transmission for the UE 2. Although only one macro eNB and the areas thereof are illustrated in FIG. 1, this embodiment of the disclosure may be applied to networking including multiple macro eNBs. Each macro eNB area includes one or more TP clusters and each cluster includes one or more TPs. Each TP cluster is configured with one or more ACs for use when a UE under the TP cluster is accessed to a TP in the cluster. AC identification information configured for the TP cluster is sent by a TP which transmits the DRS signal in the TP cluster.

Resource required to initiate the uplink access by the terminal is stored to the AC and the terminal obtains the resource with the uplink access demand only by reading an ACS and searching for an available AC. The ACS may include all ACs or a partial subset of all the ACS in a network. For example, an AC shared by a macro eNB in a specific area with a TP is divided into one or more ACSs to be sent by the macro eNB in the area or the TP. Multiple TP clusters, such as nonadjacent TP clusters, may also multiplex a same AC. As shown in FIG. 1, the eNB1, the first cluster and the second cluster share one ACS, and a terminal in the area detects a macro eNB and obtains the ACS. Each AC in the ACS includes resources used by a message 1 (abbreviated as MSG1), such as a sequence resource, a time-frequency domain resource and the like used by an access request message sent by the terminal. The each AC further includes resources used by a message 2 (abbreviated as MSG2) and information on configuration of control a channel thereof. The MSG2 refers to a response message sent by a network-side device in response to the access request message sent by the terminal. After obtaining the AC, the terminal may find an uplink preamble sequence range, randomly select a preamble sequence and initiate an uplink access, namely the MSG1, on the time-frequency resource specified by the AC. A TP which receives the MSG1 sends a response message, namely the MSG2, based on corresponding AC information.

The DRS includes a DRS sequence and a DRS load. The load may be changeable and may be zero. The DRS load may carry one or more of AC indication information and ACS information. The AC indication information may also include one or more of an Access Configuration Sets Identity (abbreviated as ACS ID) information and an Access Configuration Index (abbreviated as ACI) information. In another example, when there is a mapping relationship between the DRS sequence or the DRS identity and the AC or the ACI, the DRS sequence or the DRS identity may also be used as the AC indication information.

The DRS load and the DRS sequence may be transmitted on different resources. Herein, the different resources are non-connected time domain resource, frequency domain resource, time-frequency domain resource or space domain resource. The DRS sequence may carry the DRS sequence and may further carry the DRS ID and other information such as position indications of receiving and sending areas on a sub-frame. The above-described ACS ID, the ACT and the ACS may also be used as an independent signal period to be transmitted. Information of resources used by the ACS is further indicated by the system information of the macro eNB or the DRS.

In this example, the DRS may implement a function of an AC indication, but the function of the DRS is not limited to this. Besides, the DRS may further be used in cell discovery, coarse synchronization, channel estimation, channel measurement, carrying and sending configuration information of a system, etc. The functions may also be implemented by the ACS. When necessary, corresponding information may be defined in the ACS.

For a scene with double connection, the terminal keeps the connection with the macro eNB all the time and may directly obtain the ACS information from the macro eNB. When an LTE system and a new RAT system coexist, the macro eNB may be a macro eNB of the LTE and may also be a macro eNB of the new RAT system. When all systems are the new RAT systems, the macro eNB may be the new RAT system. When the macro eNB is the macro eNB of the LTE, the system information is obtained in a manner of the LTE, thereby obtaining the ACS. When the macro eNB is the macro eNB of the new RAT system, the ACS is obtained in a manner of the new RAT. The manner of obtaining the ACS from the new RAT may be detecting system information of the macro eNB of the connected new RAT and obtaining the ACS information from a specified resource (for example, a resource position is agreed in a protocol) and may also be obtaining based on DRS indication information (for example, indicate whether the DRS, resources used by the DRS and the like are present or not) transmitted by the macro eNB of the new RAT system.

For a scene of a single connection, the terminal may be first accessed to the macro eNB, and obtains the ACS information of the macro eNB in a manner similar to the macro eNB with the double connection. The terminal may further locally store the ACS information obtained from the macro eNB. The terminal may store ACSs of cells corresponding to one or more Physical Cell Identifiers (abbreviated as PCIs). In a scene of switching the terminal, the terminal may search the stored ACS for an AC indicated by new AC indication information, and then receives a new ACS when the AC is not founded.

For a condition in which the terminal is connected to the macro eNB all the time or the terminal is first connected to the macro eNB, the terminal may further obtain auxiliary information for receiving the DRS from the macro eNB, such as resource of the DRS, a period of the DRS and ID information of a DRS to be received. After obtaining these information, the terminal may determine when and on which resource to detect the DRS. Furthermore, since a range of the DRS ID is known, the number of blind detection of the DRS may be reduced and the complexity of the blind detection is reduced. For example, when the maximum value of the DRS ID is 256 and the to-be-detected range of the DRS ID given here is 65-128, the range of blind detection is reduced by three-fourths, thereby the detection speed and the detection accuracy of the terminal are higher.

For a condition in which the single connection is provided and the terminal cannot obtain the information from the macro eNB, the terminal may obtain the ACS based on the DRS after the DRS is obtained by blind detection. The obtaining manner may be detecting on resources used by an ACS indicated by the DRS to obtain the ACS, or may also be obtaining the ACS from a load portion of the DRS. Herein, the resources include one or more of the time-domain resource, the frequency-domain resource and the space domain frequency.

It is to be noted that, based on different actual networking scenes, the terminal may first detect the ACS and then detect the DRS signal, or may also first detect the DRS signal and then detect the ACS. For example, the terminal is first connected to the macro eNB to obtain the ACS and then detects the DRS signal; or the terminal first detects the DRS signal and then detects the ACS of the macro eNB; or the terminal first detects the DRS signal and then detects the ACS resource based on a DRS indication or acquires the ACS from a load of the DRS signal.

The DRS is only sent on a part of TPs in each TP cluster. Different network layers may also be selected by the ACS, such as only on the macro eNB, and transmission frequencies of both are relatively low. With such a mechanism, the system ensures to be environment-friendly and energy-saving, moreover, the system overhead is very small and the inter-cell interference is significantly reduced. Therefore, it is very suitable for a 5G system, particularly a UDN system.

Second Example

This example illustrates how to indicate and acquire the ACS.

When a macro eNB sends auxiliary information for receiving the ACS, a terminal may detect system information sent by the macro eNB and obtain the ACS therefrom. The system information of the macro eNB may further include information for assisting the terminal to receive a DRS, such as a transmission period of the DRS and a range of a DRS ID to be received. The system information of the macro eNB may further include information for assisting the terminal to receive the ACS, such as a transmission period of the ACS, resource of the ACS and an ID of an ACS to be received.

When the terminal cannot or does not obtain the ACS in a manner of macro eNB assisting, the terminal may detect a DRS sent by a TP and obtain ACS information. For example, when the terminal does not detect the ACS from the macro eNB, the terminal acquires information of resources used by the ACS from the detected DRS signal and detects the ACS on corresponding resources; or when the terminal does not detect the ACS from the macro eNB, the terminal obtains the ACS by decoding a load portion of the detected DRS.

Third Example

This example illustrates how to search for the AC, namely, to determine the available AC.

According to different actual implementations, manners of reading the AC are described below with examples.

First Manner

FIG. 10 illustrates two ACSs. Each ACS is provided with multiple DRS IDs and ACs. Each DRS ID corresponds to one AC, or multiple DRS IDs correspond to one ID. Different ACSs correspond to different DRS IDs, so that it ensures that ACs of DRS IDs corresponding to different ACSs are different. In such a manner, the DRS ID is also used as an ACI (may be replaced into the ACI), and it is only required to search for ACs corresponding to an ACS table based on the DRS ID.

Second Manner

FIG. 11 illustrates two ACSs. Each ACS ID corresponds to one ACS. Each ACS is provided with multiple DRS IDs. Each DRS ID corresponds to one AC. However, a same DRS ID may be multiplexed in different ACSs. In such a manner, it is required to search for ACS corresponding to the ACS ID based on the ACS IDs and then search for AC corresponding to the DRS ID based on the DRS ID (or ACI).

Third Manner

In this manner, each ACS ID corresponds to one ACS. Each ACS is provided with multiple ACIs and one ACT is mapped to one AC. Moreover, there is also a mapping relationship between the DRS IDs and the ACIs (it may be agreed in a standard/a protocol, or is configured in a system), as shown in FIG. 12. In order to enable the user to have more uplink resources, different DRS IDs may correspond to a same ACT. In such a manner, ACSs corresponding to the ACS IDs are searched for first. When the ACI is known, an AC corresponding to the ACI is searched for based on the ACI. When the ACI is unknown, an ACI corresponding to the DRS ID is searched for based on the DRS ID and then AC corresponding to the ACT is searched for based on the ACI.

When a terminal finds multiple ACs based on AC indication information, the terminal may use which AC to access at discretion, for example, the terminal may preferentially select the AC to access based on a signal intensity of the received AC indication information.

Fourth Example

This example illustrates how to acquire the ACS by a terminal.

The terminal may obtain one or more ACSs in multiple manners. For example, the terminal detects macro eNBs corresponding to one or more PCTs of an LTE to obtain one or more ACSs; or the terminal detects a macro eNB of the new RAT system to obtain one or more ACSs; or the terminal detects a TP (such as a low-power eNB or a relay station) to obtain one or more ACSs.

The terminal may locally store ACS with ACS ID. After new AC indication information is detected and when the AC indication information includes the ACS ID, the terminal locally searches for ACSs with the same ACS ID. If yes, the terminal uses the ACSs as available ACSs and then searches the available ACSs for an available AC based on the ACIs (or the DRS ID). When the AC indication information only includes the ACI and different ACSs have different ACIs, the terminal searches local ACSs for ACSs of the same ACI. If yes, the found AC of the ACI is used as the available AC. When the available AC is not found, the terminal acquires a new ACS by detection and searches the new ACS for the AC.

The embodiment of the disclosure further provides a computer readable storage medium, which stores a computer executable instruction. The computer executable instruction implements the above-described signal transmission method when being executed by a processor.

Numerals of the embodiments of the disclosure are merely for description and do not represent merits of the embodiments. According to the description of the embodiments, those skilled in the art may clearly understand that the above-described embodiment methods may be implemented by software and a necessary universal hardware platform, and of course, may also be implemented by hardware. However, in most cases, the former is a preferred embodiment. Based on such an understanding, the technical solutions of the embodiments of the disclosure may be embodied in form of a software product. The computer software product is stored in a storage medium (such as ROM/RAM, a magnetic disk and an optical disk), and includes multiple instructions arranged to enable a terminal device (which may be a mobile phone, a computer, a server, a network device or the like) to execute the method in each embodiment of the disclosure.

The above description are embodiments of the disclosure and is not intended to limit the disclosure. Those skilled in the art should understand that the disclosure may have various modifications and variations. Any modification, equivalent substitution, improvement and the like made within the spirit and principle of the disclosure should be included in the scope of protection of the disclosure.

INDUSTRIAL APPLICABILITY

According to the embodiments of the disclosure, the transmission and the indication of the AC may be implemented, the overhead is small, the interference is small, and the requirements of a novel wireless access system such as a wireless access system in a 5G may be met. Further, a wakeup mechanism may be supported when TPs are networked independently.

The invention claimed is:

1. A signal transmission method, comprising: sending, by a transmit point of a new Radio Access Technology (RAT) system, access configuration (AC) indication information to a terminal under a transmit point cluster in which the transmit point is located, wherein the AC indication information is used for indicating an AC available in an access configuration set (ACS) to the terminal; wherein sending, by the transmit point, the AC indication information to the terminal comprises: sending, by the transmit point, a Discovery Reference signal (DRS), the DRS comprises the AC indication information, or sending, by the transmit point, a DRS comprising a sequence portion and a load portion, wherein the load portion of the DRS carries the AC indication information, or sending, by the transmit point, a DRS and the AC indication information on different resources, wherein the DRS comprises or excludes information on resources used by the AC indication information wherein the transmit point is one or more transmit points and the one or more transmit points are a part of a plurality of transmit points included in the transmit point cluster wherein only one of the one or more transmit points transmits the DRS, other dormant transmit points without a service demand do not send the DRS and are awakened upon detection of an access request message of the terminal on resources specified by the AC, or one or more transmit points transmits the DRS and system information, other dormant transmit points without a service demand do not send system information, do not send the DRS, and are awakened upon detection of an access request message of the terminal on resources specified by the AC; wherein the AC comprises at least one of resource information of a first resource and resource information of a second resource; the first resource is a resource used for the terminal to send an access request message; the second resource is a resource used for the transmit point to send a response message in response to the access request message of the terminal; the resource information of the second resource is implicitly indicated by the resource information of the first resource and an agreed positional relationship between the second resource and the first resource, and wherein the transmit point cluster uses the AC.

2. The method of claim 1, further comprising:
sending, by a second network-side device, first auxiliary information for receiving the DRS to the terminal, wherein the first auxiliary information comprises at least one of the following: information on resources used by the DRS, a transmission period of the DRS or identification information of the DRS to be received.

3. The method of claim 1, wherein
the DRS is applied to a new Radio Access Technology (RAT) system, and is used in at least one of AC information indication, cell discovery, channel estimation, channel measurement or coarse synchronization.

4. The method of claim 1, further comprising:
sending, by a second network-side device, second auxiliary information for receiving the AC indication information to the terminal, wherein the second auxiliary information comprises at least one of information on resources used by the AC or a transmission period of the AC.

5. The method of claim 1, wherein
the AC indication information comprises at least one of ACS identification information or AC identification information.

6. The method of claim 5, wherein
the AC identification information comprises an AC index, or
the AC identification information comprises a DRS identity or a DRS sequence, and there is a one-to-one or many-to-one mapping relationship between the DRS identity or the DRS sequence and the AC or the AC index.

7. The method of claim 2, further comprising:
sending, by at least one of the second network-side device or the transmit point, the ACSs to the terminal.

8. The method of claim 7, wherein
sending, by the transmit point, the ACSs to the terminal comprises:
sending, by transmit point, the DRS, wherein a load portion of the DRS carries the ACS, or
sending, by the transmit point, the DRS and the ACS on different resources, wherein the DRS comprises or excludes information on resources used by the ACS.

9. The method of claim 7, wherein the transmit point sends the ACSs to the terminal; the method further comprises: sending, by the second network-side device, third auxiliary information for receiving the ACS sent by the transmit point to the terminal, wherein the third auxiliary information comprises at least one of the following: information on resources used by the ACS, a transmission period of the ACS or identification information of an ACS to be received.

10. The method of claim 7, wherein
sending, by the second network-side device, the ACSs to the terminal comprises: sending, by the second network-side device, the ACS as system information to the terminal.

11. The method of claim 7, wherein
the ACS sent by the second network-side device to the terminal comprises all ACs used in a network, or comprises all ACs used in a setting area, wherein the setting area comprises serving areas of at least one of the second network-side devices.

12. The method of claim 7, wherein
the second network-side device is a macro eNB of which a service area covers at least one of transmit point clusters.

13. The method of claim 1, wherein
both of the resource information of the first source and the second source are used for indicating an actual use resource of a message or a resource range within which the actual use resource is located, and the actual use resource comprises at least one of a time domain resource, a frequency domain resource, a space domain resource or a code domain resource.

14. A network-side apparatus, comprising: a transmit point, wherein the transmit point comprises: a processor and a memory storing instructions, which, when executed by the processor, cause the processor to execute operations comprising: acquiring access configuration (AC) indication information, wherein the AC indication information is used for indicating an AC available in an access configuration set (ACS) to a terminal under a transmit point cluster in which the transmit point is located; and sending the AC indication information to the terminal; wherein sending, by the transmit point, the AC indication information to the terminal comprises: sending, by the transmit point, a Discovery Reference signal (DRS), the DRS comprises the AC indication information, or sending, by the transmit point, a DRS comprising a sequence portion and a load portion, wherein the load portion of the DRS carries the AC indication information, or sending, by the transmit point, a DRS and the AC indication information on different resources, wherein the DRS comprises or excludes information on resources used by the AC indication information; wherein the transmit point is one or more transmit points and the one or more transmit points are a part of a plurality of transmit points included in the transmit point cluster, wherein only one of the one or more transmit points transmits the DRS, other dormant transmit points without a service demand do not send the DRS and are awakened upon detection of an access request message of the terminal on resources specified by the AC, or the one or more transmit points transmits the DRS and system information, other dormant transmit points without a service demand do not send system information, do not send a-the DRS, and are awakened upon detection of an access request message of the terminal on resources specified by the AC; wherein the AC comprises at least one of resource information of a first resource and resource information of a second resource; the first resource is a resource used for the terminal to send an access request message; the second resource is a resource used for the transmit point to send a response message in response to the access request message of the terminal; the resource information of the second resource is implicitly indicated by the resource information of the first resource and an agreed positional relationship between the second resource and the first resource; and wherein the transmit point cluster uses the AC.

15. The network-side apparatus of claim 14, further comprising: a second network-side device, wherein the second network-side device comprises:
   a processor and
   a memory storing instructions, which, when executed by the processor, cause the processor to execute the following operations comprising:
   acquiring the ACSs to be sent to a terminal, and
   sending the obtained ACS to the terminal; or
   acquiring auxiliary information, wherein the auxiliary information is used for assisting the terminal to receive at least one of the DRS, the AC or the ACS, and
   sending the obtained auxiliary information to the terminal.

* * * * *